US006873140B2

United States Patent
Saggini et al.

(10) Patent No.: US 6,873,140 B2
(45) Date of Patent: Mar. 29, 2005

(54) DIGITAL CONTOLLER FOR DC-DC SWITCHING CONVERTERS

(75) Inventors: Stefano Saggini, San Donato Milanese (IT); Massimo Ghioni, Monza (IT); Angelo Geraci, Milan (IT); Francesco Villa, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 69 days.

(21) Appl. No.: 10/616,691

(22) Filed: Jul. 9, 2003

(65) Prior Publication Data

US 2004/0051510 A1 Mar. 18, 2004

(30) Foreign Application Priority Data

Jul. 12, 2002 (IT) .................................... MI2002A1539

(51) Int. Cl.[7] .................................................. G05F 1/40
(52) U.S. Cl. ...................................... 323/283; 323/285
(58) Field of Search ................................. 323/282, 283, 323/285, 351

(56) References Cited

U.S. PATENT DOCUMENTS

| | | | | |
|---|---|---|---|---|
| 3,978,393 A | * | 8/1976 | Wisner et al. | 323/272 |
| 5,481,178 A | * | 1/1996 | Wilcox et al. | 323/287 |
| 5,731,731 A | * | 3/1998 | Wilcox et al. | 327/403 |
| 6,307,360 B1 | * | 10/2001 | Kajiwara et al. | 323/282 |
| 6,469,481 B1 | * | 10/2002 | Tateishi | 323/282 |

OTHER PUBLICATIONS

Saggini, et al. "A low–complexity high–performance digital control architecture for Voltage Regulator Modules" Proceedings of the 34th IEEE Power of Electronics Specialist Conference, PESC. 2003, vol.1, Jun. 15–19, 2003, Mexico, pp. 121–126.

* cited by examiner

*Primary Examiner*—Adolf Berhane
(74) *Attorney, Agent, or Firm*—Carol W. Burton, Esq.; William J. Kubida, Esq.; Hogan & Hartson L.L.P.

(57) ABSTRACT

A voltage regulator includes an input terminal adapted for being coupled to an input voltage and an output terminal adapted for being coupled to a load. The voltage regulator includes a first switch adapted for selectively coupling to the input terminal and to the output terminal, a current sensor for measuring an output current flowing towards the output terminal, a voltage sensor for measuring the output voltage from the output terminal, and a digital controller which drives the first switch. The controller closes the first switch when the error voltage is less than a first preset value of voltage and opens the first switch when the output current is greater than a first preset value of current.

11 Claims, 8 Drawing Sheets

DIGITAL CONTOLLER FOR DC-DC SWITCHING CONVERTERS

BACKGROUND OF THE INVENTION

1. Field of the Invention

The present invention relates to voltage regulators, and more particularly to a digital controller for DC-DC switching converters.

2. State of the Art

The operating principle of a switching converter is known: a high frequency wave (PWFM), generated starting from the input voltage, is successively mediated by means of a passive filter to obtain the desired direct voltage in output. A control system that carries out the measuring of the status variables of the power circuit and consequently regulates the parameters Ton and Toff of the high frequency wave PWFM is needed to keep the value of said voltage stable.

The requirements of the sector for voltage regulators are becoming more and more demanding in terms of current that can be supplied (up to 100 A and up to 400 A is foreseen in the coming years), of reply speed of the system to the load transients and of efficiency which, in the low consumption applications, results in being a fundamentally important specification. In addition there is considerable stimulus towards the reduction of costs and of the shape factor of the output voltage, which involves a reduction of the output filter and thus an increase in the switching frequency, keeping performances high, also for lower current (3/6A) feeds used for dedicated microprocessors, DSP, etc. For the high current applications, attention has recently been concentrated on the multiphase configurations, in which the current capacity of the system is managed by an array of synchronous buck type converters in parallel. Even though nearly all the applications present on the market use analog type controllers, some innovative solutions based on digital control are being widely accepted. The well-known advantages of digital control are capable of satisfying a market that requests more and more complex controllers, low cost applications and an extremely rapid time to market.

SUMMARY OF THE INVENTION

In view of the state of the technique described, the object of the present invention is to provide a voltage regulator, and more particularly a digital controller for DC-DC switching converters which is simple and whose complexity is reduced.

In accordance with the present invention, said object is achieved by means of a voltage regulator having an input terminal adapted for being coupled to an input voltage and an output terminal adapted for being coupled to a load comprising: a first switch adapted for coupling selectively said input terminal to said output terminal; a current sensor for measuring an output current flowing towards said output terminal; a voltage sensor for measuring an output voltage on said output terminal; a digital controller that drives said first switch; characterised in that said controller closes said first switch when the error voltage, obtained by subtracting a constant reference voltage from said output voltage, is less than a preset first value of voltage and opens said first switch when said output current is greater than a preset first value of current.

Thanks to the present invention it is possible to produce a digital controller with high system performances, characterised by a reduced cost of the analog-digital and digital-analog conversion section, and by reduced complexity of the control system.

The controller proposed works in variable frequency mode (that is carries out the control of the turn-on time Ton and turn-off time Toff independently). The possibility of modifying the working frequency is used to immunize the system against the problems of quantization that usually cause instability of the system due to the so-called limit cycles; in this manner the conversion section needs a reduced number of bits, consequently reducing the complexity of the control system.

In addition, the analog-digital (A/D) conversion of the output voltage is based on a technique that is similar to that used in a tracking ADC, which permits the reduction of the complexity and the dimensions of the converter, as it is based on the exclusive use of a DAC converter. The control system can be applied to a system with a number of phases that can be configured by the user by using 2 converters DAC with a modest number of bits (6–8 bit). In addition the control system can be expanded to implement sophisticated functioning modes at low consumption that can be activated when the load currents are reduced below certain limits.

BRIEF DESCRIPTION OF THE DRAWINGS

The characteristics and advantages of the present invention will appear evident from the following detailed description of an embodiment thereof, illustrated as non-limiting example in the enclosed drawings, in which.

DETAILED DESCRIPTION

Figure 1:
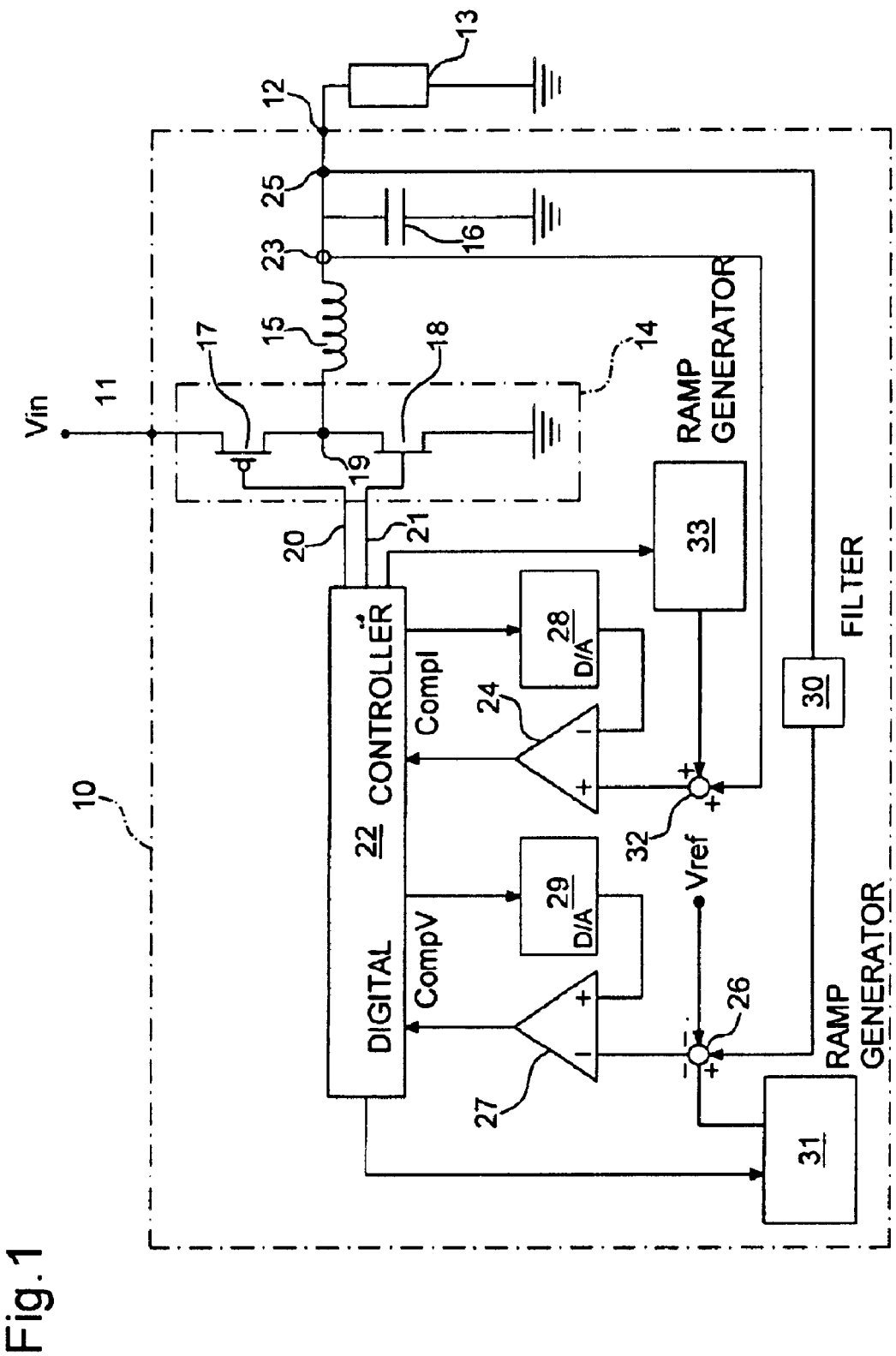
FIG. 1 represents a block diagram of a voltage regulator in accordance with the present invention.

Now making reference to FIG. 1, a voltage regulator 10 is coupled to an input voltage Vin through an input terminal 11 and is coupled to a load 13 through an output terminal 12. The voltage regulator 10 comprises a switching circuit 14 that acts as a switch for coupling and decoupling alternately the input terminal 11 to the intermediate terminal 19. The switching circuit 14 also comprises a rectifier, such as a diode or a switch, fit for coupling the intermediate terminal 19 to ground. The opening and closing of the switching circuit 14 generates an intermediate voltage VPWFM (phase voltage) between the branch point 19 and ground, which has a rectangular course.

A filter is interposed between the switching circuit 14 and the load 13, and is made up of an inductor 15, connected between the intermediate terminal 19 and the output terminal 12, and a capacitance 16 connected in parallel to the load 13. Said filter converts the intermediate voltage VPWFM in a substantially direct voltage at the output terminal 12.

The switching circuit 14 comprises a switch, such as for example a first transistor 17 having the source connected to the input terminal 11, the drain connected to the intermediate terminal 19 and the gate to the terminal 20 and a rectifier, such as for example a second transistor 18 having the drain connected to the intermediate terminal 19, the source connected to ground and the gate to the terminal 21. The first transistor 17 can be a P-channel MOS device (PMOS), while the second transistor 18 can be an N-channel MOS device (NMOS).

A digital controller 22 drives the switching circuit 14 supplying the command signals to the terminals 20 and 21.

A current sensor 23 measures the current flowing in the inductor 15 and supplies it to the branch point adder 32. This signal can be added to a current ramp with positive slope SlopeI, generated by the circuit 33, to carry out a compensation that would enable the system to function correctly also with an operating cycle (duty-cycle), defined as ratio $T_{on}/(T_{on}+T_{off})$, exceeding 50%. The current ramp is zeroed by the controller 22 in correspondence with the turn-on of the transistor 17. The current signal, to which the ramp can also be overlapped, is finally applied to the non-inverting input of a comparator 24.

A voltage sensor 25 measures the output voltage $V_{out}$ on the terminal 12: this voltage is filtered by means of a single-pole low-pass filter 30, which removes the residual voltage ripple, and is successively supplied to the branch point adder 26 which subtracts from the filtered output voltage Vout a preset reference voltage $V_{ref}$, equal to the value required from the output voltage, and a voltage ramp with positive slope SlopeV, generated by the circuit 31. The determination of the slope of the voltage ramp is based on the amplitude of the noise and of the disturbances to the inverting terminal of the comparator 27. On the assumption that we have a disturbance with a peak-peak value equal to Vpp and assuming a variation interval of the switching frequency equal to dFsw, the slope of the ramp will be determined by the following relation: SlopeV>Vpp/|dTsw|, where |dTsw|=|dFsw|/Fsw.

The voltage ramp is zeroed by the controller 22 in correspondence with the turn-on of the transistor 17. The resulting error voltage is finally supplied to the inverting input of a comparator 27. A first digital-analog converter 28 (DACI) receives a digital signal corresponding to the peak current Ipk preset by the controller 22, converts it into an analog signal which is applied to the inverting input of the comparator 24. A second digital-analog converter 29 (DACV) receives a digital signal corresponding to the minimum error voltage Vlow preset by the controller 22, converts it into an analog signal which is applied to the non-inverting input of the comparator 27. The comparator 24 supplies the signal CompI to the controller 22 and the comparator 27 supplies the signal CompV to the controller 22.

The controller 22 determines the turn-on and the turn-off of the switching circuit 14 on the basis of the status of the signals CompI and CompV, having as only limit the maximum switching frequency allowable (preset), which will have to be considerably lower than the clock frequency of the controller.

The control rules can be summarized as follows:

when the level of current, measured by the current sensor 23, exceeds a preset upper limit Ipk, that is, when the signal CompI switches from 0 to 1, the connection to the battery $V_{in}$ is interrupted;

when the level of the error voltage, obtained by subtracting a reference voltage and a voltage variable at ramp from the output voltage, measured by the voltage sensor 25, goes down beyond a preset lower limit Vlow, that is when the signal CompV switches from 0 to 1, the connection to the battery $V_{in}$ is restored.

Figure 2A:
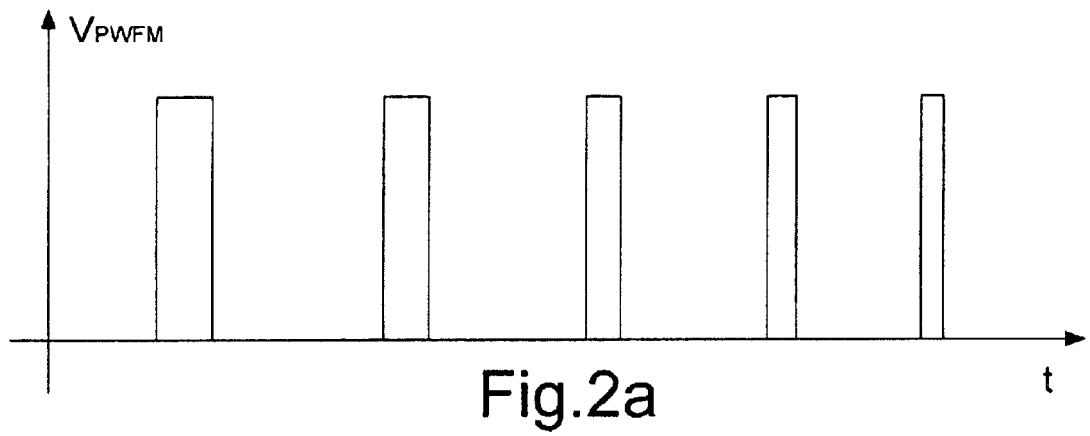
FIGS. 2a–2c show the graphs of the phase voltage Vpwfm, of the current in the inductor and of the error voltage upon increase of the current delivered to the load (output current)

FIG. 2a shows the course of the phase voltage Vpfwm, produced by the switching circuit 14 between the intermediate branch point 19 and ground, upon increase of the output current.

Figure 2B:
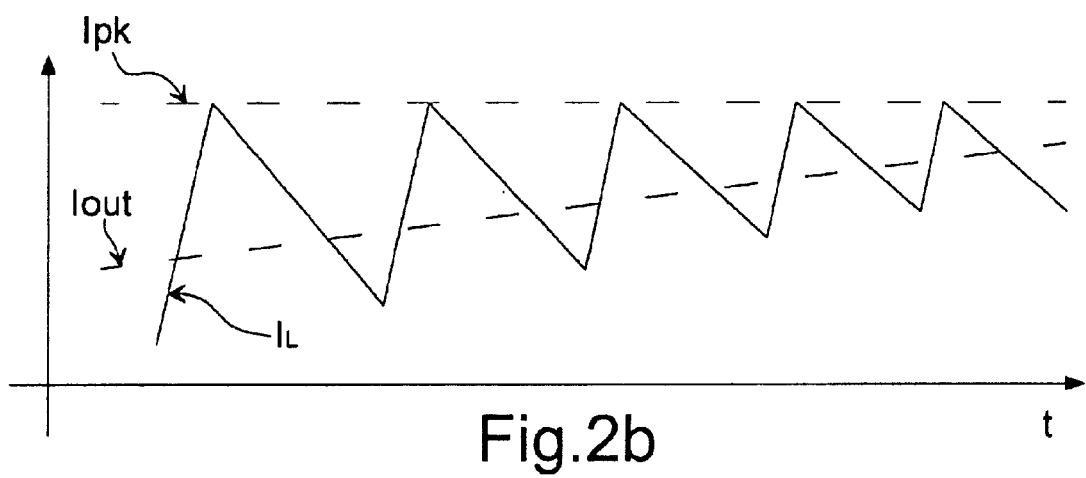

FIG. 2b shows in a continuous line the course of the current IL in the inductor 15 and in a dotted line the course of the output current Iout (equal to the average value of the current in the inductor) upon increase of the output current. In addition, the level of peak current Ipk preset by the controller 22 is represented. For simplicity, the situation in which the compensation of current is not implemented is illustrated.

Figure 2C:
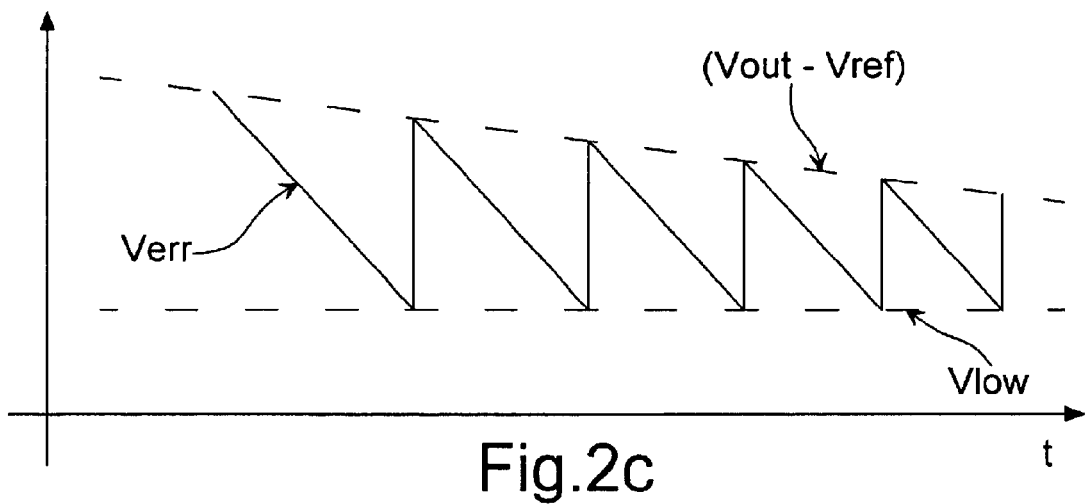

In correspondence, FIG. 2c shows in a continuous line the course of the error voltage $V_{err}$, measured downstream from the branch point adder 26 and in a dotted line the course of the difference voltage ($V_{out}-V_{ref}$) upon increase of the output current. In addition, the level of voltage Vlow preset by the controller 22 is shown.

Let us assume for example that, starting from a condition of perfect balance between the current delivered by the converter and that absorbed by the load, the latter increases. The balance of current at the branch point of the capacitor 16 would determine the progressive discharge of the latter, so that the average level of voltage in output would progressively tend to diminish (the low side of the ripple of error voltage remains constant, while the amplitude of the ripple varies). On the basis of the second control rule, it would entail the switching circuit 14 to turn on in advance, which would be followed by the decrease of the amplitude of the current ripple and therefore, as the peak is constant (set by the first digital-analog converter 28), the increase of the average value of current delivered by the converter to the load, as is represented in FIG. 2b. The switching frequency would progressively increase, up to when the level of current in output to the converter becomes in turn stable. In this condition of balance the values of the current delivered by the converter and absorbed by the load would again coincide.

Figure 3A:
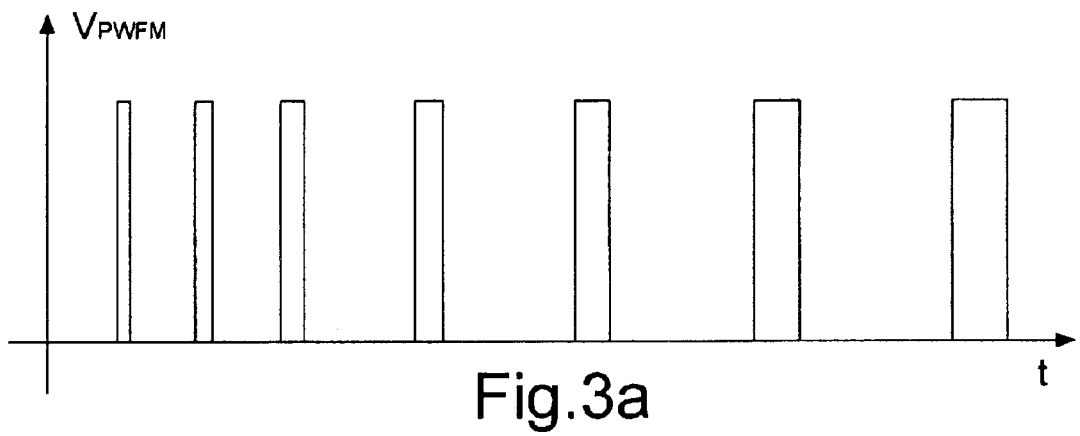
FIGS. 3a–3c show the graphs of the phase voltage Vpwfm, of the current in the inductor and of the error voltage upon decrease of the current delivered to the load.
Figure 3B:
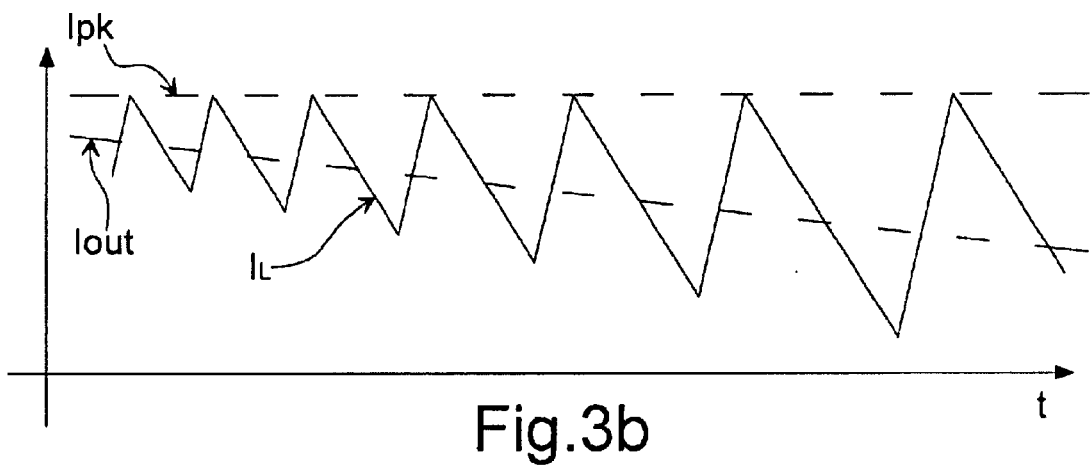
Figure 3C:
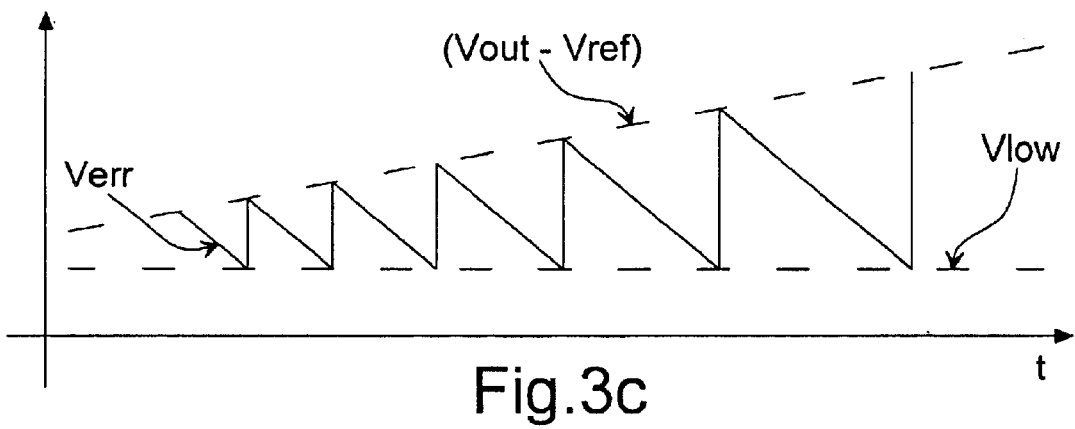

FIGS. 3a, 3b and 3c show the courses of the phase voltage Vpwfm, of the output current and of the error voltage upon diminishing of the output current, in a similar manner to FIGS. 2a, 2b and 2c.

The peculiarity of the control method enables the system to deliver an average level of current, which is greatly independent from the specific value of peak pre-selected, through a simple variation of the switching frequency. The switching frequency settles on such a value to exactly balance the current requested by the load with the average current delivered by the converter.

The relation that links the switching frequency to the level of current delivered in regime can be easily derived from the fundamental equations given below. The entity of the current ripple ΔI, in almost stationary functioning regime of the converter, is expressed by:

$$\Delta I = T_{on} \frac{V_{in} - V_{out}}{L} \quad (1)$$

where $T_{on}$ is the duration of the interval of turning on the switching circuit 14.

The relation $V_{out}/V_{in}=T_{on}$, that links the output voltage and the input voltage in a Buck type converter operating under regime conditions is well known. Replacing this relation in the equation (1) you obtain:

$$\Delta I = \frac{1}{f_{sw}} \frac{V_{out}}{V_{in}} \frac{V_{in} - V_{out}}{L} = \frac{V_{out}}{f_{sw}} \frac{(1-D)}{L} \quad (2)$$

where $$f_{sw} = \frac{1}{(T_{on} + T_{off})}$$

is the switching frequency, D is the duty-cycle and L is the value of the filter inductance.

The current delivered by the converter is expressed by:

$$I_{out} = I_{pk} - \frac{\Delta I}{2} \quad (3)$$

where $\Delta I$ is the amplitude of the current ripple.

Also considering the existence of a current compensation ramp SlopeI, summed to the signal measured by current sensor 23, which would permit the control method to operate at duty cycles greater than 50% and considering the existence of a propagation time delay of the logic turn-off signal of the transistor 17, the equation of the output current is transformed into:

$$I_{out} = I_{pk} - \frac{\Delta I}{2} - SlopeI \frac{D}{f_{sw}} + \tau \frac{\Delta I f_{sw}}{D} \quad (4)$$

where $\tau$ is the propagation time delay and SlopeI is the slope of the current compensation ramp.

In the case in which the last term of the equation (4) is negligible, it is possible to select the slope of the compensation ramp SlopeI so that the output current Iout results independent from $V_{in}$.

In fact applying:

$$SlopeI = \frac{Vo}{2L} \quad (5)$$

and replacing this expression in the equation (4) you obtain:

$$I_{out} = I_{pk} - \frac{V_{out}}{2Lf_{sw}} \quad (6)$$

A peculiar aspect of the present control system lies in the fact that the variation of the output current and the variation of the output voltage are linked to each other by a linear relation. In fact, the variation of the output voltage can be expressed in function of the variation of the switching period as follows:

$$dV_{out} = SlopeV dT_{sw} \quad (7)$$

where $dT_{sw}$ is the variation of the switching period.

The variation of the output current can be expressed as follows:

$$dI_{out} = -\frac{V_{out}(1-D)}{2L} dT_{sw} - SlopeI \cdot D \cdot dT_{sw} \quad (8)$$

where both the output voltage Vout and the duty-cycle D have been considered constant in first approximation.

Replacing (7) in (8) you obtain:

$$dI_{out} = -\frac{V_{out}(1-D)dV_{out}}{2LSlopeV} - \frac{SlopeI}{SlopeV} \cdot D \cdot dV_{out} \quad (9)$$

which is reduced to:

$$dI_{out} = -\frac{V_{out}}{2LSlopeV} dV_{out} \quad (10)$$

in the case in which $$SlopeI = \frac{V0}{2L}$$

is selected.

It is therefore shown that the variation of current depends linearly on the variation of voltage. The converter presents an intrinsic output resistance $R_{out}=-dV_{out}/dI_{out}$, otherwise known as droop characteristic, which results useful for optimising the use of the regulation window in presence of transients of heavy loads. The dynamic output resistance $R_{out}$ cannot however be regulated and its value can be considerably far from the optimal value.

In addition, the equations (4) and (6) highlight that to be able to vary with continuity the current the current delivered in the interval between 0 and Ipk, having a single level of peak current available, it would be necessary to modulate the switching frequency within very wide margins.

Being obliged, on one hand to necessarily limiting the amplitude of the interval of switching frequencies and on the other regulating with precision the dynamic output resistance, it results necessary to introduce a multiplicity of current levels Ipk and of voltage levels Vlow. Basically, the voltage Vlow and the current Ipk have preset values but can vary.

Every level Ipk will have a continuous interval of currents $\Delta$Iout defined by a corresponding interval of frequencies $\Delta$fsw on the basis of the equation (4). If the reference levels are selected so that the corresponding current intervals $\Delta$Iout overlay, we obtain a continuum of currents that can be delivered in output. The minimum number of levels will be such that this continuum covers the interval between 0 and the maximum value of load current foreseen by the application.

It is important to underline that the current peak levels Ipk are quantized, but the average current media delivered to the load varies with continuity. Practically, the control method permits the use of a limited number of current peak levels Ipk (and therefore a limited number of bits of the digital-analog converter DACI) without falling into instability caused by the intervention of the limit cycles. In fact, between one quantization level and the other the current delivered moves through a continuum of levels upon variation of the switching frequency. The greater will be the interval of tolerable frequencies, the lower will be the number of levels produced by and DACI and vice versa.

By means of the equation (6) it is possible to determine the minimum number of bits necessary for a given application, having set the interval Δfsw in which it is possible to vary the switching frequency. Differentiating (6) and approximating the differential terms with finite differences you obtain:

$$\frac{\Delta I_{out}}{\Delta f_{sw}} = \frac{V_{out}}{2Lf_{sw}^2} \quad (11)$$

The amplitude of the less significant bit (LSB) produced by the DACI can be expressed as:

$$LSB_{DACI} = \frac{I_{max}}{2^n}$$

where n is the number of bits and $I_{max}$ is the maximum value of peak-current that can be generated by the DACI.

The interval of current values ΔIout that can be generated in an interval of frequencies $\Delta f_{sw}$ will have to be necessarily greater than or equal to the amplitude of the less significant bit generated by the DACI. It follows that:

$$\frac{I_{max}}{2^n} \le \frac{V_{out}}{2Lf_{sw}^2}\Delta f_{sw} \quad (12)$$

from which $$n_{min} = \log_2\left(\frac{I_{max}f_{sw}}{V_{out}\cdot \Delta f_{sw}/Lf_{sw}}\right)+1 = \log_2\left(\frac{I_{max}f_{sw}}{\Delta I_{max}\Delta f_{sw}}\right)+1 \quad (13)$$

where $\Delta I_{max}$ is equal to the maximum current ripple.

The number of current peak levels can thus be extremely limited: for example, to deliver an average variable current with continuity from 0 to 8A ($I_{max}$), with a maximum current ripple equal to 3A, tolerating a maximum frequency interval of 200 kHz around 1.3 MHz, it is necessary that a minimum number of bits is equal to 6.

The passage from one level of peak current to another will have to be accompanied by a similar passage of level of the preset voltage Vlow, so that the corresponding variations are linked by a preset function. This function can be, for example, the simple law of variation of the so-called droop function, that consists of an equivalent output of the power supply. Or if this is not contemplated by the load specifications, there can be another dynamic link between the quantities. For example the variation of the voltage level could be determined by a variation of the level of current following a law that can have an integral component and a linear component. In addition, the law chosen could change according to the operative conditions or the command given externally; for example it could have different slopes according to the load condition or the input voltage.

Preferably, the equivalent resistance of the power supply unit is implemented to optimise the use of the regulation window in the presence of heavy load transients; its optimal value is approximately equal to the ratio between the interval of voltages tolerated by the load and the maximum current requested. In this manner the regulator sets an output voltage that depends linearly on the current.

To implement the preselected function, the digital values of the voltage Vlow and the digital values of the current Ipk are linked to each other through a function preset by a logic network, made by means of a look-up table, positioned in the processing system 22.

The passage from one preset level of voltage and of current to another can be determined on the basis of two distinct algorithms.

In the preferred implementation an algorithm based on the frequency control is used.

In this case, the value of the current Ipk increases by a preset value of current and the value of the voltage Vlow decreases by a preset value of voltage when the driving frequency of the switching circuit 14 is greater than a first preset value of frequency. The value of the current Ipk decreases by a preset value of current and the value of the voltage Vlow increases by a preset value of voltage and when the driving frequency of the switching circuit 14 is less than a second preset value of frequency.

Figure 4A:
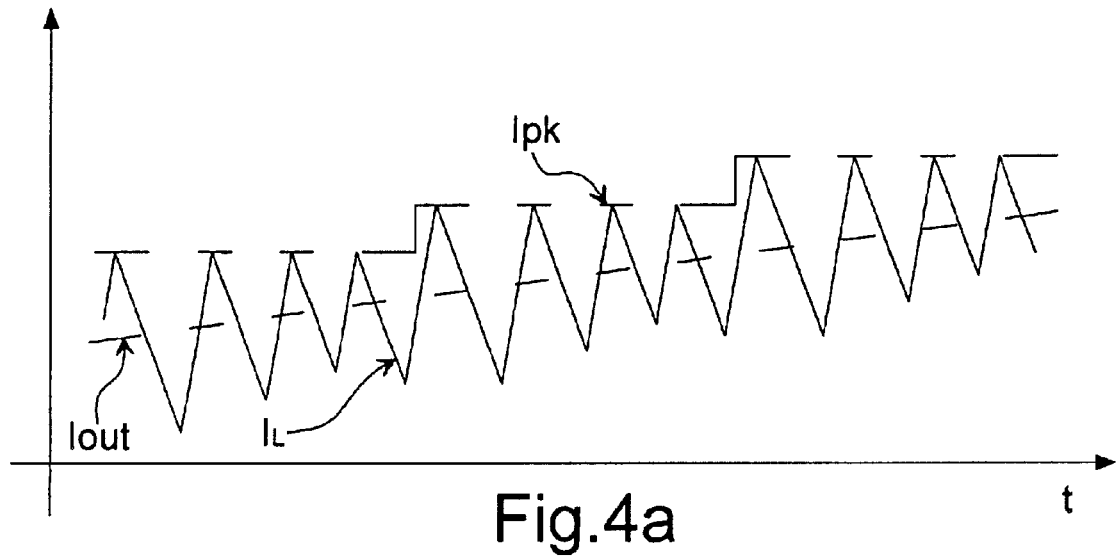
FIGS. 4a–4b show the graphs of the variation of the preset levels of voltage and of current upon increase of the current delivered to the load.
Figure 4B:
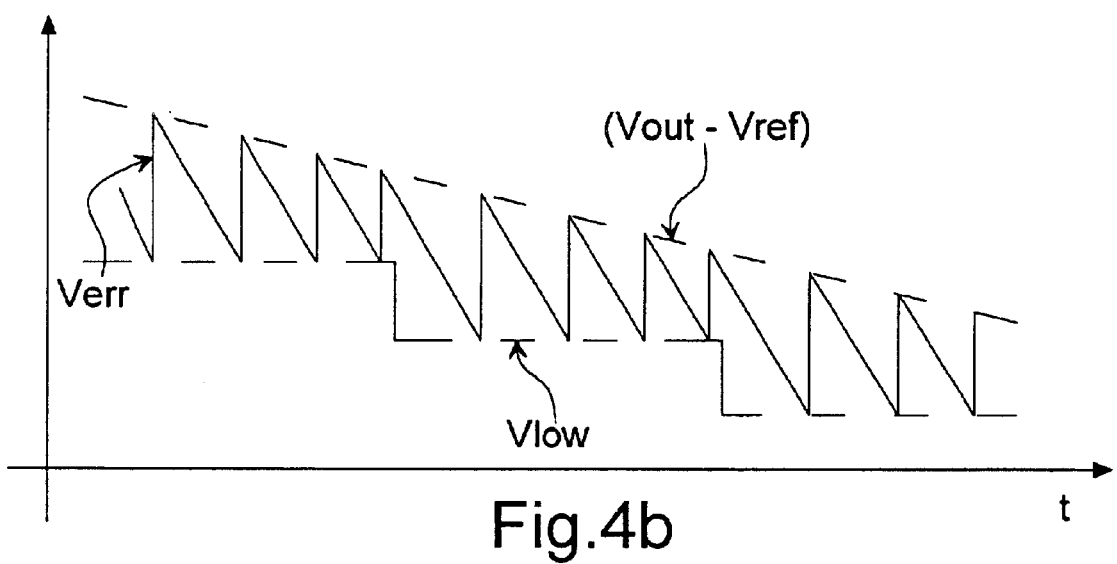

FIGS. 4a and 4b show respectively the courses of the current levels Ipk and of the voltage levels Vlow, in the case in which the driving frequency of the switching circuit 14 increases and thus the voltage Vlow decreases and the current Ipk increases.

Alternatively an algorithm based on the maximum amplitude of the voltage ramp generated by the circuit 31 can be used.

In this case, the value of the current Ipk increases by a preset value of current and the value of the voltage Vlow decreases by a preset value of voltage when the amplitude of the voltage ramp 31 is less than a first preset value of amplitude. The value of the current Ipk decreases by a preset value of current and the value of the voltage Vlow increases by a preset value of voltage and when the amplitude of the voltage ramp 31 is greater than a second preset value of amplitude.

In regard to the preferred embodiment of the invention, previously described, several alternatives are possible. For example, the voltage ramp can be generated digitally by means of a first counter inserted in the controller 22 and beating at the clock frequency of the system, whose output is summed to the digital value of the voltage Vlow and converted in analog form through the digital-analog converter 29. The counter is zeroed by the controller 22 in correspondence with the transistor 17 being turned on.

In similar manner, the eventual current compensation ramp can be generated digitally by means of a second counter inserted in the controller 22 and beating at the clock frequency of the system, whose output is summed to the digital value of the current Ipk and converted in analog form through the digital-analog converter 28. The counter is zeroed by the controller 22 in correspondence with the transistor 14 being turned on.

In a further embodiment, the voltage ramp 31 can be totally removed. In this case, the characteristic saw-tooth course, needed for correct functioning of the controller 22, is obtained by removing the filtering section 30 and in this manner using the natural ripple of the voltage Vout due to the presence of an equivalent resistance series (ESR) on the filter capacitor 16.

In a different embodiment, the control logic can be inverted compared to that previously described. In other terms, when the level of current, measured by the current sensor 23, goes down beyond a preset lower limit Ilow, the connection to the battery $V_{in}$ is interrupted. When the voltage level error exceeds a preset upper limit Vpk the connection to the battery $V_{in}$ is restored. In this embodiment the inputs of the comparators 24 and 27 will have to be inverted and the voltage ramp 31 will have to be summed to the output voltage Vout. The system controlled in this manner is stable for duty-cycles exceeding 50%. For duty-cycles lower than 50% the current ramp of compensation 33 will have to be subtracted from the current signal measured by the sensor 23.

Figure 5:
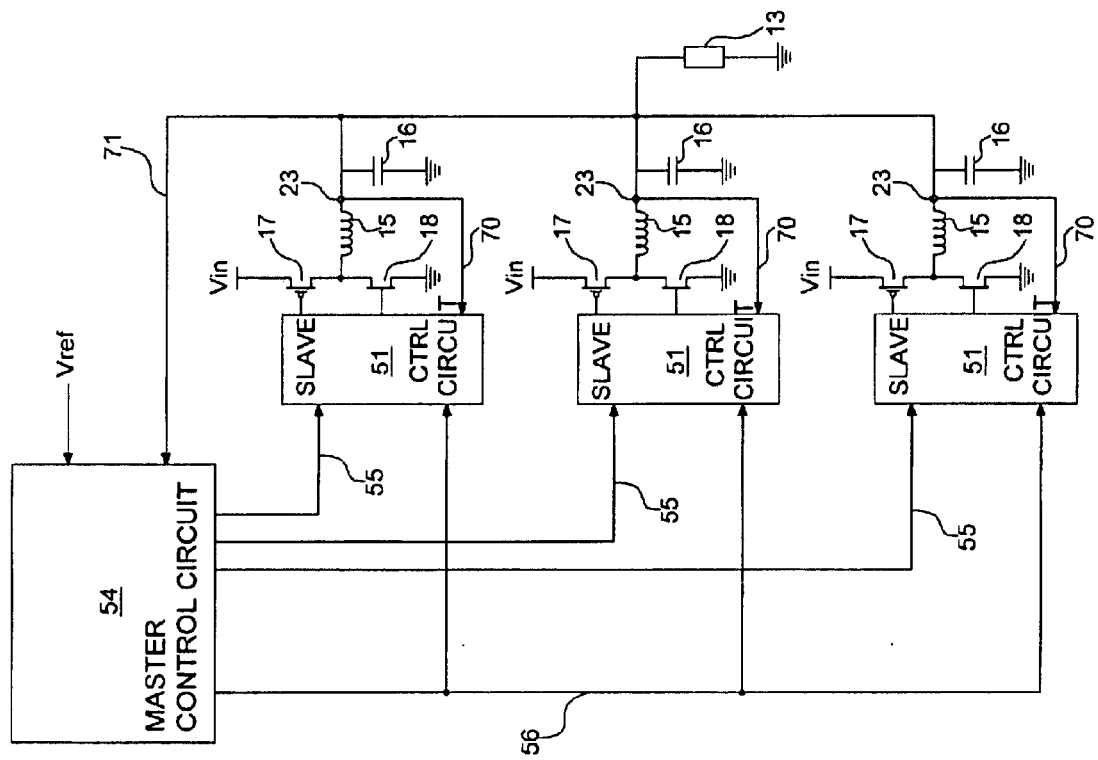
FIG. 5 shows a block diagram of a three-phase voltage regulator in accordance with the present invention.

The extension of the control system from monophase to multiphase is quite natural, as it is simply enough to identify a criterion with which the phase to activate can be selected and send it the turn-on signal. Automatically the phases are turned on in an interlacing manner to a frequency that is an N-th fraction of the central control frequency where N is the number of the phases to drive. The effect of the multiplexing on the previously stated equations is simply constituted by a multiplication of the current for N, thus, in this manner, the equivalent resistance is divided by N. The same also goes for the equivalent resistance created by the movement of the converters of voltage and of current. Two methodologies have been identified for the choice of turning on the phases: a simple rotation principle, on the basis of which each phase is switched in relation to a set cyclic sequence, and the principle of the minimum current, on the basis of which the phase that conveys the minimum current value is turned on. FIG. 5 shows a block diagram of a three-phase voltage regulator in accordance with the present invention, based on the first methodology of activating the phases (cyclic activation). Three voltage regulators of the type represented in FIG. 1 are given, and equal elements have equal references. They are respectively controlled by three slave control circuits 51. They receive in input the current signal 70, corresponding to the current that flows in the inductor 15, measured by a current sensor 23. They also receive in input the turn-on signal 55 of the single phase and the signal 56 corresponding to the preset peak current Ipk, coming from a control circuit master 54. They produce in output the driving signals of the transistors 17 and 18.

The master and slave structure is the basis for an architecture that is easy to configure on the basis of the quantity of current requested.

Figure 6:
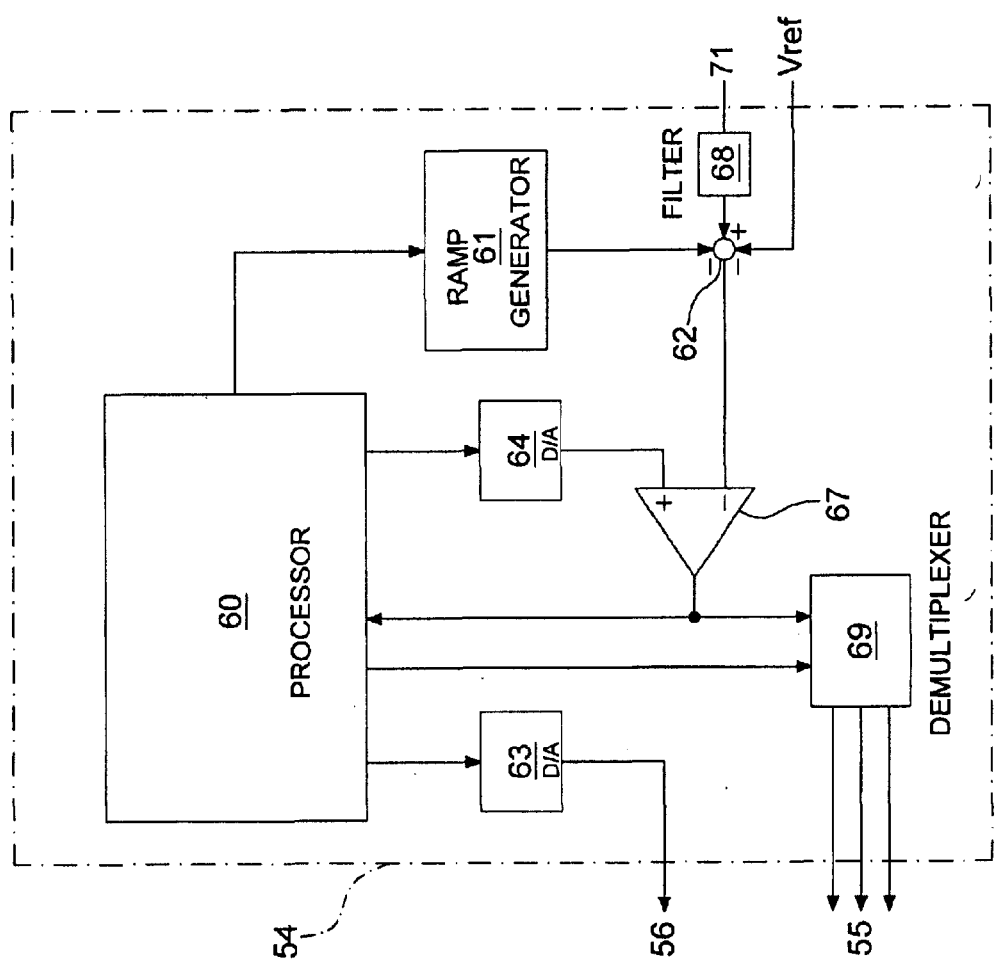
FIG. 6 shows a block diagram of a first part of the three-phase voltage regulator in FIG. 5 in accordance with the present invention.

FIG. 6 shows a block diagram of a first part of the three-phase voltage regulator in FIG. 5 in accordance with the present invention, in particular a block diagram of the master control circuit 54 is shown.

The master control circuit 54 receives in input the signal 71 relating to the output voltage Vout, that is filtered by means of a single pole low-pass filter 68 and successively supplied to the branch point adder 62, which subtracts from the filtered signal 71 a constant reference voltage Vref, corresponding to the output voltage desired, and a voltage ramp with positive slope SlopeV, generated by the circuit 61. The resulting error voltage is finally supplied to the inverting input of a comparator 67, whose output is applied to an input of a demultiplexer 69 and to the processing system 60. The demultiplexer 69 receives a signal from the processing system 60 in input and produces in output the turn-on command signals 55 of every single phase.

A first digital-analog converter 64 receives a digital signal corresponding to the minimum error voltage Vlow from the processing system 60, it converts it into an analog signal which is applied to the non-inverting input of the comparator 67. A second digital-analog converter 63 receives a digital signal corresponding to the peak current Ipk from the processing system 60 and converts it into an analog signal 56, that represents the value of the peak current Ipk to assign to the single phases.

Figure 7:
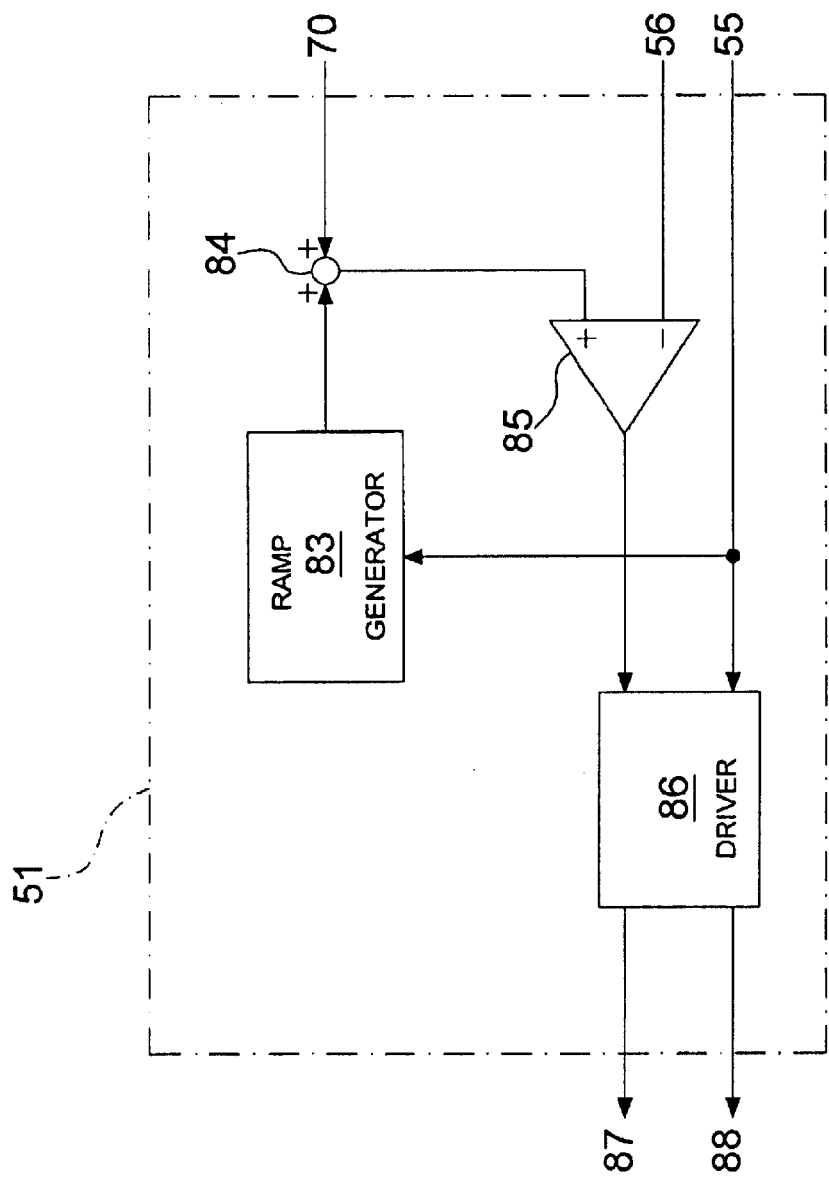
FIG. 7 shows a block diagram of a second part of the three-phase voltage regulator in FIG. 5 in accordance with the present invention.

FIG. 7 shows a block diagram of a second part of the three-phase voltage regulator in FIG. 5 in accordance with the present invention, in particular a block diagram of the slave control circuit 51 is shown. The slave control circuit 51 receives in input the current signal 70, coming from the current sensor 23, and supplies it to a branch point adder 84.

A current ramp, generated by the circuit 83 can be summed to the current signal 70 can be summed to guarantee that the control circuit slave 51 functions correctly with duty cycles greater than 50%. The resulting signal is applied to the non-inverting input of a comparator 85. The other input of the comparator 85 receives the signal 56 corresponding to the peak current Ipk. The output of the comparator 85 is applied to a circuit 86 for driving the transistors 17 and 18, to which it supplies the command signals 87 and 88. The circuit 86 for driving the transistors 17 and 18 also receives in input the turn-on signal 55 of the single phase coming from the master control circuit 54. The turn-on signal 55 is also used to zero the current ramp generated by the circuit 83.

In the slave section 51 a control is operated that keeps active the phase up to which the current in the corresponding inductance reaches the peak value set by the converter 63 of the master section 54. The current measured by the sensor 23 is compared with the peak current Ipk supplied by the master section 54 and the result of said comparison, with the selection command, constitutes the input of the managing logic of the section of the power transistors 17 and 18.

In general, in every slave 51 it is possible to integrate the power switches 17 and 18 from which it would be possible to directly extract a measurement the current that flows therein.

The converter 63 in the case under examination is inserted inside the master 54: in other solutions it is possible to position it in the slave 51 and distribute the digital data to all the slaves 51 through a serial or parallel bus.

Figure 8:
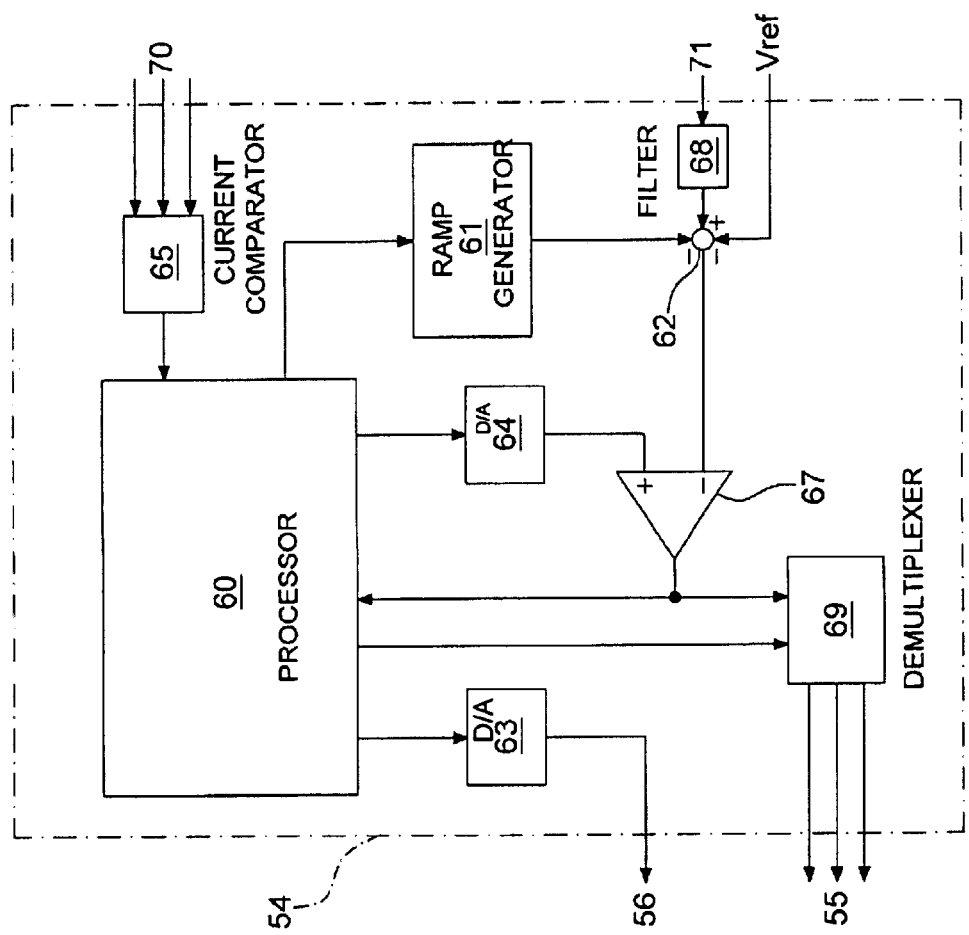
FIG. 8 shows a block diagram of a variant of a first part of the three-phase voltage regulator in FIG. 5 in accordance with the present invention.

All that has to be done is to alter the block diagram of the master control circuit 54 to implement an alternative system for activating the phases, on the basis of which the phase that conveys the minimum current value is activated. FIG. 8 shows the block diagram of the control circuit master 54 in accordance with this new embodiment.

The control circuit master 54 receives in input the signals 70 relating to the currents of every single phase that are applied to the circuit 65 that determines, instant by instant, which of the three phases has the minimum current. The output of the circuit 65 is applied to an processing system 60. The latter acts on the multiplexer 69 activating the phases not in cyclic mode, but always giving the priority to the phase that is found conveying the least current.

This control strategy is more efficient, in terms of reply in transient and of distribution of current, but requires an extension of the control architecture, to determine in real time which is the phase at minimum conveyance of current. Practically, the master controller must foresee a number of inputs of current equal to the number of the phases and an array of comparators that determine the phase at minimum current. The intrinsic flexibility of the master-slave architecture is thus partially sacrificed in this embodiment.

What is claimed is:

1. A voltage regulator comprising:
   an input terminal for receiving an input voltage;
   an output terminal coupled to a load;
   a first switch for selectively coupling said input terminal to said output terminal;
   a current sensor for measuring an output current flowing towards said output terminal;
   a voltage sensor for measuring an output voltage on said output terminal;
   a digital controller coupled to said first switch, which closes said first switch when an error voltage, obtained by subtracting from said output voltage a constant reference voltage, is less than a preset first value of voltage, and opens said first switch when said output current is greater than a preset first value of current.

2. The voltage regulator of claim 1 wherein said error voltage is obtained by subtracting from said output voltage a constant reference voltage and a variable ramp voltage.

3. The voltage regulator of claim 1 wherein said first value of preset voltage and said first value of preset current each comprise a plurality of discrete levels.

4. The voltage regulator of claim 1 wherein said first value of preset voltage and said first value of preset current are linked to each other through a preset function.

5. The voltage regulator of claim 1 wherein said first value of preset voltage and said first value of preset current are linked to each other through a linear function.

6. The voltage regulator of claim 1 wherein said first value of preset voltage and said first value of preset current are linked to each other through a linear function at times comprising at least two different slopes.

7. The voltage regulator of claim 1 wherein said first value of preset voltage and said first value of preset current are linked to each other through a function comprising an integral component and a linear component.

8. The voltage regulator of claim 1 wherein said first value of preset voltage and said first value of preset current are a function of the switching frequency of said first switch.

9. The voltage regulator of claim 1 wherein said first value of preset voltage decreases by a second value of preset voltage and wherein said first value of preset current increases by a third value of preset current when the driving frequency of said first switch is greater than a first preset frequency value.

10. The voltage regulator of claim 1 wherein said first value of preset voltage increases by a fourth value of preset voltage and wherein said first value of preset current decreases by a fifth value of preset current when the driving frequency of said first switch is less than a second preset frequency value.

11. The voltage regulator of claim 1 further comprising a second switch for selectively coupling said output terminal to ground.

* * * * *